US008843064B2

(12) United States Patent
Hwang et al.

(10) Patent No.: US 8,843,064 B2
(45) Date of Patent: Sep. 23, 2014

(54) MOBILE TERMINAL AND CONTROLLING METHOD THEREOF

(75) Inventors: Irene H. Hwang, Gyeonggi-do (KR); Sang In Seok, Seoul (KR); Won Gab Jeon, Seoul (KR); Ji Yeon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 834 days.

(21) Appl. No.: 12/474,189

(22) Filed: May 28, 2009

(65) Prior Publication Data
US 2010/0136908 A1 Jun. 3, 2010

(30) Foreign Application Priority Data
Nov. 28, 2008 (KR) ........................ 10-2008-0119468

(51) Int. Cl.
| | |
|---|---|
| H04B 7/00 | (2006.01) |
| H04W 4/02 | (2009.01) |
| H04W 4/00 | (2009.01) |
| H04M 1/725 | (2006.01) |
| H04L 29/08 | (2006.01) |
| H04W 8/18 | (2009.01) |
| H04W 48/18 | (2009.01) |

(52) U.S. Cl.
CPC ............... *H04W 4/02* (2013.01); *H04W 4/001* (2013.01); *H04M 1/7253* (2013.01); *H04M 2250/10* (2013.01); *H04W 8/18* (2013.01); *H04M 1/72572* (2013.01); *H04L 67/18* (2013.01); *H04W 48/18* (2013.01)
USPC ........ 455/41.2; 455/418; 455/435.3; 455/558

(58) Field of Classification Search
CPC ........................................................ H04W 4/02
USPC ............................... 455/41.2, 418, 435.3, 558
See application file for complete search history.

(56) References Cited

U.S. PATENT DOCUMENTS

| | | | | |
|---|---|---|---|---|
| 5,797,091 | A | * | 8/1998 | Clise et al. ................. 455/404.2 |
| 2005/0260989 | A1 | * | 11/2005 | Pourtier et al. ............ 455/435.3 |
| 2006/0094405 | A1 | | 5/2006 | Dupont |
| 2006/0252424 | A1 | * | 11/2006 | Ohno et al. ................. 455/432.1 |
| 2007/0197261 | A1 | * | 8/2007 | Humbel ........................ 455/558 |
| 2007/0278290 | A1 | * | 12/2007 | Messerges et al. ........... 235/380 |

FOREIGN PATENT DOCUMENTS

| | | |
|---|---|---|
| EP | 1480386 | 11/2004 |
| WO | 2006111782 | 10/2006 |

* cited by examiner

*Primary Examiner* — Hsin-Chun Liao
(74) *Attorney, Agent, or Firm* — Lee, Hong, Degerman, Kang & Waimey (57) ABSTRACT

A mobile terminal and controlling method thereof includes determining priority between at least two tag types used for short-range communication according to a current location, and establishing the short-range communication using the tag type having the highest priority among of the tag types. When the location of the terminal or the service provider is changed due to roaming, an appropriate tag for short-range communication is automatically or manually determined allowing the convenient use of a payment service.

20 Claims, 10 Drawing Sheets

| Stage | Mnemonic | Command bytes | | Definition | Sender |
|---|---|---|---|---|---|
| | | CMD0 | CMD1 | | |
| Protocol activation | ATR_REQ | (0XD4) | (0X00) | Attribute Request | I |
| | ATR_RES | (0XD5) | (0X01) | Attribute Response | T |
| | WUP_REQ | (0XD4) | (0X02) | Wakeup Request | I in active mode only |
| | WUP_RES | (0XD5) | (0X03) | Wakeup Response | T in active mode only |
| | PSL_REQ | (0XD4) | (0X04) | Parameter selection Request | I |
| | PSL_RES | (0XD5) | (0X05) | Parameter selection Response | T |
| Data exchange | DEP_REQ | (0XD4) | (0X06) | Data Exchange Protocol Request | I |
| | DEP_RES | (0XD5) | (0X07) | Data Exchange Protocol Response | T |
| Deactivation | DSL_REQ | (0XD4) | (0X08) | Deselect Request | I |
| | DSL_RES | (0XD5) | (0X09) | Deselect Response | T |
| | RLS_REQ | (0XD4) | (0X0A) | Release Request | I |
| | RLS_RES | (0XD5) | (0X0B) | Release Response | T |

MOBILE TERMINAL AND CONTROLLING METHOD THEREOF

CROSS REFERENCE TO RELATED APPLICATIONS

Pursuant to 35 U.S.C. §119(a), this application claims the benefit of an earlier filing date and right of priority to Korean Application No. 10-2008-0119468, filed on Nov. 28, 2008, the contents of which are hereby incorporated by reference herein in their entirety.

FIELD OF THE INVENTION

The present invention relates to a mobile terminal, and more particularly, to a mobile terminal and a method for controlling a mobile terminal. Although the present invention is suitable for a wide scope of applications, it is particularly suitable for use in a terminal for further increasing the terminal's convenience of use.

DISCUSSION OF THE RELATED ART

A mobile terminal may be configured to perform various functions including data and voice communications, capturing images and video via a camera, recording audio, reproducing audio or music files and outputting music on a speaker system, and displaying images and video on a display. Some terminals support game playing while other terminals are also configured as multimedia players. More recently, mobile terminals receive broadcast and multicast signals permitting viewing of multimedia content such as videos and television programs.

Terminals may be divided into mobile terminals and stationary terminals. The mobile terminals may be classified into handheld terminals and vehicle mounted terminals according to whether the terminals are personally carried. A variety of recent terminals, including mobile terminals, provide more complex and various functions.

Current trends are to increase the functions of mobile terminals, and to incorporate hardware, software, and structural improvements. Besides having more functions, mobile terminals are becoming more compact, thinner, and lighter. Terminals may be of a folder type, slide type, bar type, rotation type, wrist watch-type, etc.

Recently, terminals are provided with a short-range communication module or a personal area network module to perform payment services. However, a tag (a protocol for short-range communication) may differ according to a country or service provider in which a terminal is located because various type tags are technically available for the respective payment services. A rule or policy determines what kind of tag will be used for a country or a service provider. When a payment service using short-range communication is unavailable due to a wrong tag, a terminal may indicate a malfunction of the terminal instead of an incorrect tag.

Therefore, when a mobile terminal enters a different location or service provider area through roaming, it is necessary to automatically or manually reset a type of a payment service and a type of a corresponding tag according to the roaming country or the service provider.

SUMMARY OF THE INVENTION

Accordingly, the present invention is directed to a mobile terminal and a method for controlling the mobile terminal that substantially obviate one or more problems due to limitations and disadvantages of the related art.

An object of the present invention is to provide a mobile terminal and controlling method thereof, by which a payment service using short-range communication can be performed despite that a terminal located country or service provider is changed due to roaming of the terminal outside the geographical coverage area of a home network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve these objects and other advantages and in accordance with the purpose of the invention, as embodied and broadly described herein, a mobile terminal includes a wireless communication unit, a user input unit, a memory storing information of at least two tag types for performing short-range communication using the wireless communication unit, and a controller configured to determine the priority between tag types for use in the short-range communication according to a current location of the terminal.

In another aspect of the present invention, a method of controlling a mobile terminal including determining priority between at least two tag types used for short-range communication according to a current location, and establishing the short-range communication using the tag type having the highest priority among the at least two tag types.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

A mobile terminal according to the present invention is described in detail with reference to the drawings. In the following description, suffixes "module" and "unit" of constituent elements are provided for easily describing a specification, instead of having a distinctive meaning or function.

The mobile terminal described in the specification may include a cellular phone, a smart phone, a laptop computer, a digital broadcast terminal, personal digital assistant (PDA), a portable multimedia player (PMP), a navigation system, and so on.

However, by way of non-limiting example only, further description will be with regard to a mobile terminal, and it should be noted that such teachings may apply equally to other types of terminals.

Figure 1:
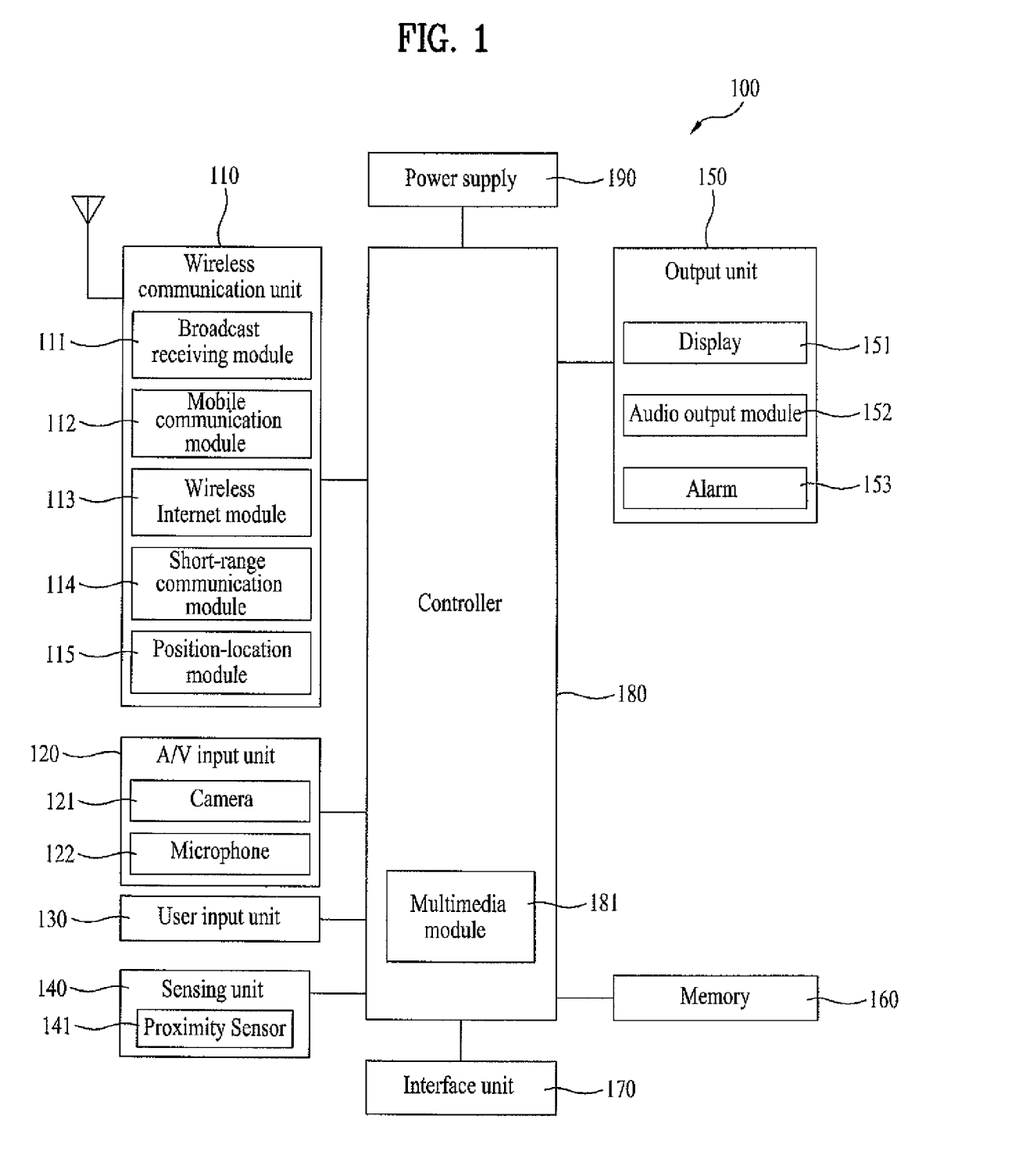
FIG. 1 is a block diagram of a mobile terminal in accordance with one embodiment of the present invention.

FIG. 1 is a block diagram of a mobile terminal 100 according to an embodiment of the present invention. The mobile terminal 100 may include a wireless communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal may be varied.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wired communication unit. The wireless communication unit 110 and wired communication unit can be commonly referred to as a communication unit.

A broadcast receiving module 111 receives a broadcast signal and broadcast associated information from an external broadcast managing entity from a broadcast channel. The broadcast channel may include a satellite channel and a terrestrial channel. The broadcast managing entity generally refers to a system which transmits a broadcast signal and broadcast associated information. At least two broadcast receiving modules 111 can be provided to the mobile terminal 100 in pursuit of simultaneous receptions of at least two broadcast channels or broadcast channel switching facilitation.

The broadcast related information may exist in various forms. For example, the broadcast related information may exist in the form of an electronic program guide (EPG) of a digital multimedia broadcast (DMB) or in the form of an electronic service guide (ESG) of a digital video broadcast-handheld (DVB-H).

The broadcast signal may be implemented, for example, as a TV broadcast signal, a radio broadcast signal, or a data broadcast signal. If desired, the broadcast signal may further include a broadcast signal combined with a TV or radio broadcast signal.

The broadcast receiving module 111 receives broadcast signals using various broadcast systems. Particularly, the broadcast receiving module 111 may receive digital broadcast signals using digital broadcast systems such as digital multimedia broadcast-terrestrial (DMB-T), digital multimedia broadcast-satellite (DMB-S), media forward link only (MediaFLO®), DVB-H and integrated services digital broadcast-terrestrial (ISDB-T) systems. Receiving multicast signals is also possible. If desired, data received by the broadcast receiving module 111 may be stored in a suitable device, such as a memory 160.

The mobile communication module 112 transmits and receives a radio signal to and from at least one of a base station, an external terminal, and a server on a mobile communication network. The radio signal may include a voice call signal, a video telephony call signal or data in various forms according to transmission and receiving of text and multimedia messages.

Moreover, the mobile communication module 112 is able to receive a mobile communication signal including at least one of a country identifier and a network identifier from the mobile communication network. The mobile communication module 112 is able to use at least one of the received country identifier and the received network identifier to obtain a current location of the terminal and is also able to use the network identifier to identify a service provider of the mobile communication.

The wireless Internet module 113 is a module for wireless Internet access and may be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on may be used as a wireless Internet technique. The wireless internet module can be replaced with a wired internet module in non-mobile terminals. The wireless internet module 113 and wired internet module may be commonly referred to as an internet module.

A short-range communication module 114 facilitates relatively short-range communications over a personal area network (PAN). Suitable technologies for short-range communication my include, but are not limited to, near field communication (NFC), radio frequency identification (RFID), infrared data association (IrDA), ultra-wideband (UWB), as well as the networking technologies commonly referred to as Bluetooth™ and ZigBee™.

The position location module 115 confirms or obtains the position of the mobile terminal. A global positioning system (GPS) module is a representative example of the position location module 115. According to the current technology, the GPS module 115 may calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

The A/V input unit 120 is used to input an audio signal or a video signal and includes a camera 121 and a microphone 122. The camera 121 processes a frame of a still image or of a moving images obtained by an image sensor in a video telephony mode or a photographing mode. The processed image frames may be displayed on a display unit 151.

The image frames processed by the camera 121 may be stored in the memory 160 or transmitted to an external device through the radio communication unit 110. The mobile terminal 100 may include at least two cameras according to constitution of the terminal.

A microphone 122 receives an external audio signal while the portable device is in a particular mode, such as phone call mode, recording mode, or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and cameras may be used.

A user input unit 130 generates input data responsive to user manipulation of an associated input device or devices. Examples of such devices include a keypad, a dome switch, a touchpad using static pressure or capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open or closed status of the mobile terminal 100, relative positioning of components such as a display and keypad of the mobile terminal, a change of position of the mobile terminal or a component of the mobile terminal, a presence or absence of user contact with the mobile terminal, orientation, or acceleration and deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays may be configured to be transparent so that an external environment can be seen through the corresponding display. Such a display can be called a transparent display. A transparent LCD display is a representative example for the transparent display.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touch screen can be configured to detect a touch input pressure as well as a touch input position and size. A proximity sensor 141 can be provided within or around the touch screen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

An example of the operation of the proximity sensor is explained as follows. If an object approaches a sensor detecting surface while an oscillation circuit provides a radio frequency sine wave, the oscillation circuit attenuates or stops. This change is converted to an electric signal to detect a presence or non-presence of the object. If any material except a metallic object comes between the RF oscillation proximity sensor and the object, a proximity switch is able to detect the object without interference with the material.

Approaching the touch screen with the pointer not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern may be displayed on the touch screen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs an audio signal relating to a particular function or status, such as call received, message received, or errors.

The output unit 150 is further shown having an alarm 153 commonly used to signal or otherwise identify a particular event associated with the mobile terminal 100. Typical events include call received, message received and user input received.

Tactile sensations may be provided by the output unit 150. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. Various signals provided by the components of output unit 150 may be separately performed or performed using any combination of such components.

The memory 160 may store a program for the operation of the controller 180 and temporarily store input and output data (for example, phone book, messages, still images, moving images, etc.). The memory 160 may store data about various patterns of vibrations and sounds, which are provided when a touch input is applied to the touch screen.

Information on at least two tag types can be stored in the memory 160. Each of the tag types has information according to short-range communication system and priorities according to a country or service provider, and information on at least two payment services.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired or wireless data port, audio input and output ports, video input and output ports, a card socket for coupling to a memory card, a subscriber identity module (SIM) card, a user identity module (UIM) card, or removable user identity module (RUIM) card).

When the mobile terminal 110 is connected to an external cradle, the interface unit 170 supplies the mobile terminal 100 with power from the cradle and various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 controls the overall operation of the mobile terminal. For example, the controller 180 controls and processes voice communication, data communication, and video telephony. The controller 180 may include a multimedia module 181 for playing multimedia. The multimedia module 181 may be included in the controller 180 or be separate from the controller 180.

The controller 180 is able to perform a pattern recognizing process for recognizing a graphical input from the touch screen as characters or images.

A power supply 190 provides power required by the various components for the mobile terminal 100. The power may be internal power, external power, or a combination of internal and external power.

Various embodiments of the present invention may be implemented in a computer or similar device using software, hardware, or a combination of hardware and software, for example.

According to hardware implementation, the embodiments of the present invention may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for executing functions. In some cases, the embodiments may be implemented by the controller 180.

When embodiments are performed using software, embodiments such as procedures or functions may be implemented with a separate software module executing at least one function or operation. Software codes may be implemented according to a software application written in an appropriate software language. Furthermore, the software codes may be stored in the memory 160 and executed by the controller 180.

The mobile terminal 100 may be implemented in a variety of different configurations. Examples of such configurations include folder-type, slide-type, bar-type, rotational-type, swing-type and the like, and combinations thereof. For clarity, further disclosure will primarily relate to a slide-type mobile terminal 100. However such teachings apply equally to other types of mobile terminals.

Figure 2:
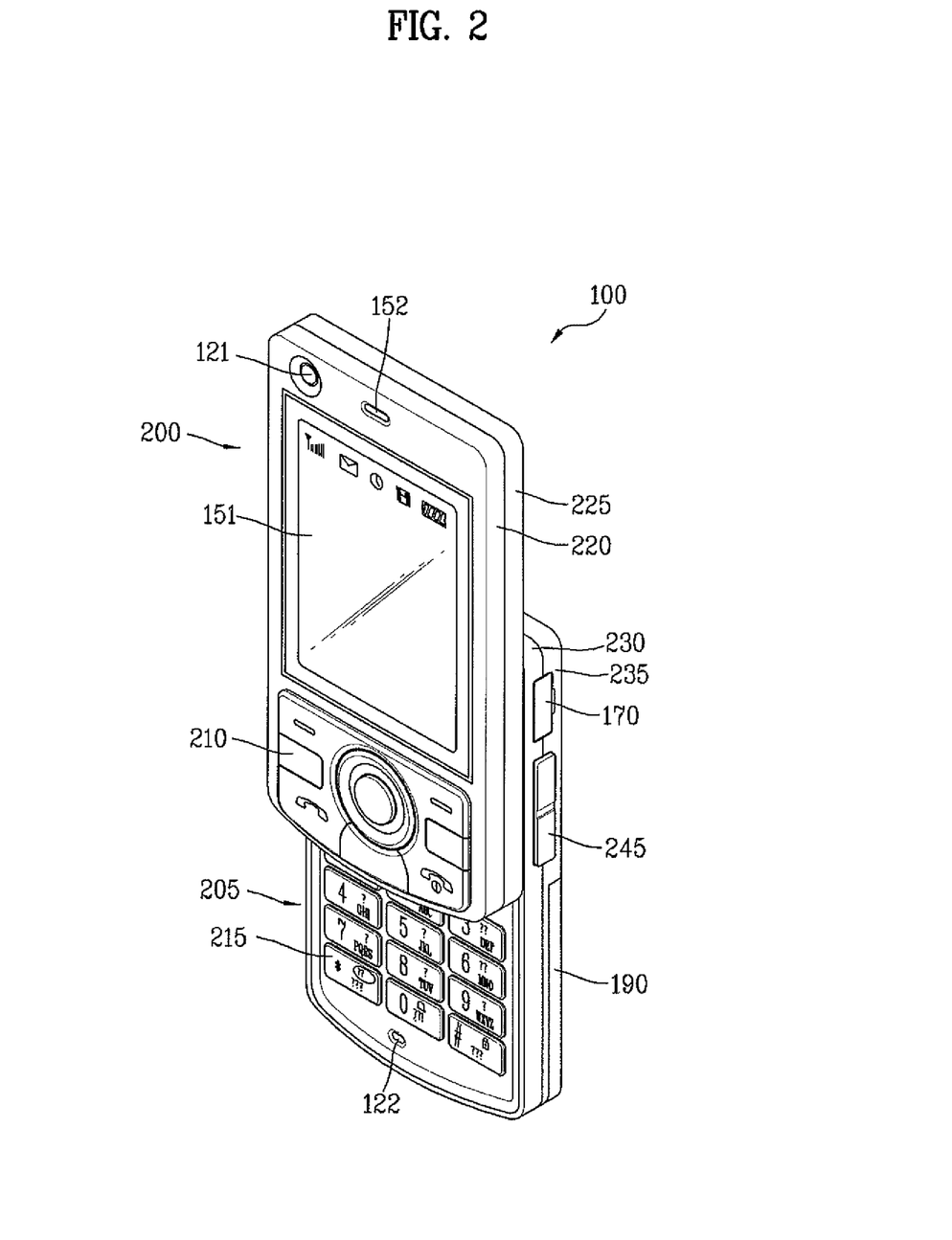
FIG. 2 is a perspective diagram of a front side of a mobile terminal according to one embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 described in FIG. 1 may include a first input unit having function keys and four directional keys 210 (for example, navigation key), a second input unit such as keypad 215 and a third input unit such as side keys 245. The function keys 210 are associated with the first body 200, and the keypad 215 is associated with the second body 205. The keypad includes various keys such as numbers, characters, and symbols to enable a user to place a call, prepare a text or multimedia message, and otherwise operate the mobile terminal 100.

The first body 200 slides relative to the second body 205 between open and closed positions. Although not shown in the drawings, a folder-type mobile terminal has a first body that folds and unfolds relative to a second body between open and closed positions. In addition, in the case of a swing-type mobile terminal, a first body swings relative to a second body between open and closed positions.

In a closed position, the first body 200 is positioned over the second body 205 in such a manner that the keypad 215 is substantially or completely obscured by the first body 200. In the open position, user access to the keypad 215 is possible. The function keys 210 are conveniently configured for a user to enter commands such as start, stop and scroll.

The mobile terminal 100 is operable in either a standby mode, in which it is able to receive a call or message and to receive and respond to network control signaling, or an active call mode. Typically, the mobile terminal 100 functions in the standby mode in the closed position and in the active mode in the open position. This mode configuration may be changed as desired.

The first body 200 is shown formed from a first case 220 and a second case 225. The second body 205 is shown formed from a first case 230 and a second case 235. The first case 230 and second case 235 are usually formed from a suitably rigid material such as injection molded plastic, or formed using metallic material such as stainless steel (STS) and titanium (Ti).

One or more intermediate cases may be provided between the first case 230 and second case 235 of one or both of the first body 200 and second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed such that it can be selectively positioned relative to first body 200 by rotating or, swiveling.

The function keys 210 are positioned adjacent to a lower side of the display 151, which is shown implemented as an LCD or OLED. The display may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of a user input unit as mentioned above, positioned along the side of second body 205. Preferably, the side keys 245 may be configured as hot keys, such that the side keys are associated with a particular function of the mobile terminal 100. An interface unit 170 is shown positioned adjacent to the side keys 245, and a power supply 190 in a form of a battery is shown located on a lower portion of the second body 205.

Figure 3:
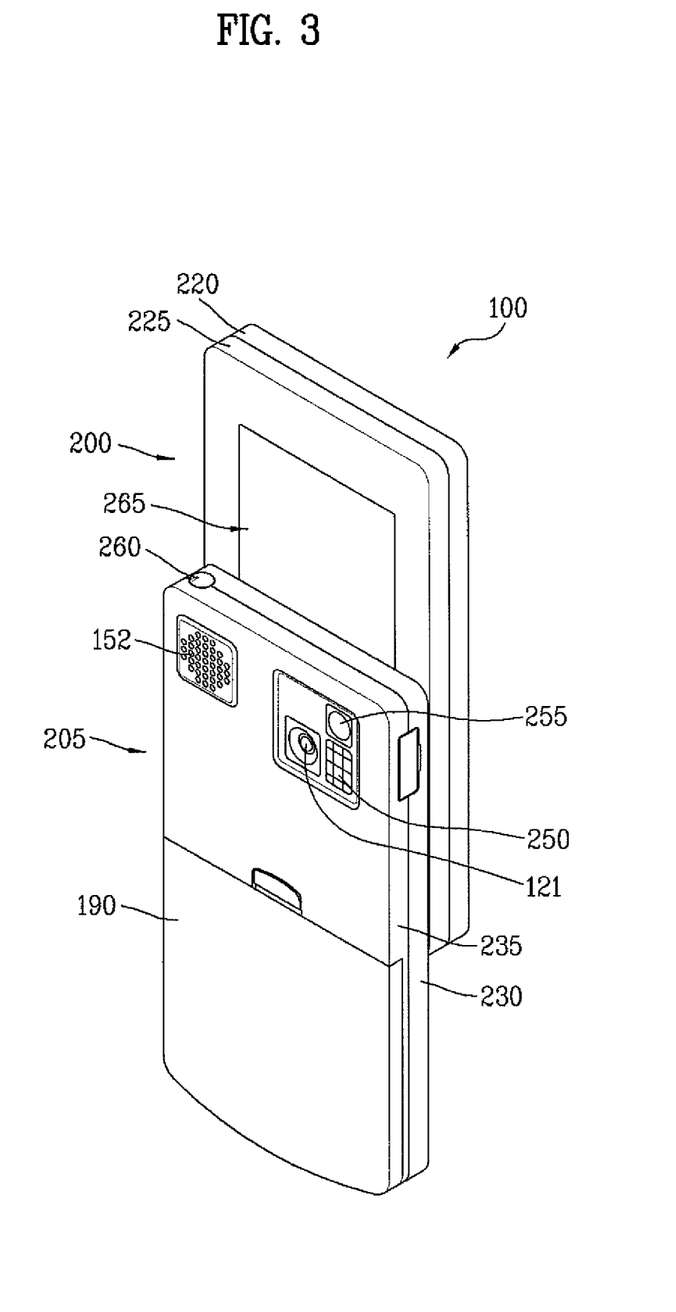
FIG. 3 is a perspective diagram of a backside of the mobile terminal shown in FIG. 2.

FIG. 3 is a rear view of the mobile terminal 100 shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 faces in a direction opposite to that of the camera 121 of the first body 200 (FIG. 2). Each of the cameras 121 of the first body 200 and second body 205 may have the same or different capabilities.

In an embodiment, the camera 121 of the first body 200 operates with a lower resolution than the camera 121 of the second body 205. Such an arrangement works well during a video conference, for example, in which reverse link bandwidth capabilities may be limited. The higher resolution of the camera 121 of the second body 205 (FIG. 3) is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205. The antenna 260 functions in cooperation with the broadcast receiving module 111 (FIG. 1) and may be fixed or configured to retract into the second body 205. The rear side of the first body 200 includes a slide module 265, which slidably couples with a corresponding slide module located on the front side of the second body 205.

The illustrated arrangement of the various components of the first body 200 and second body 205 may be modified as required or desired. In general, some or all of the components of one body may be implemented on the other body. In addition, the location and relative positioning of such components are not critical to many embodiments, and therefore, the components may be positioned at locations differing from those shown by the representative figures.

The mobile terminal 100 of FIGS. 1-3 may be configured to operate within a communication system which transmits data via frames or packets, including both wireless and wired communication systems, and satellite-based communication systems. Such communication systems utilize different air interfaces and physical layers.

Examples of air interfaces utilized by the communication systems include example, frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting examples, further descriptions will relate to a CDMA communication system, but such teachings apply equally to other system types.

Figure 4:
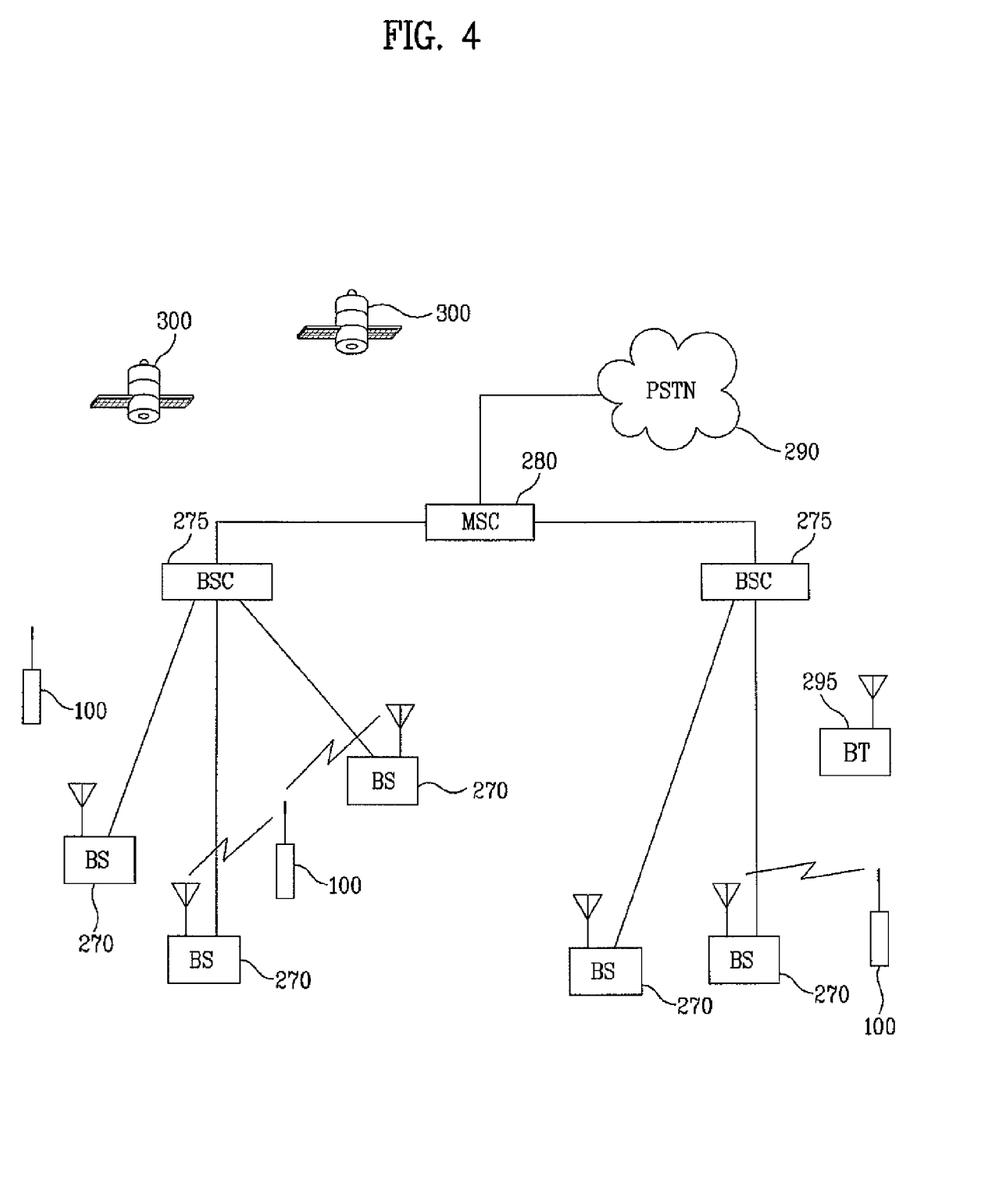
FIG. 4 is a block diagram of a wireless communication system in which a mobile terminal according to the present invention is operable.

Referring to FIG. 4, a CDMA wireless communication system is shown having a plurality of mobile terminals 100, a plurality of base stations 270, a plurality of base station controllers (BSCs) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. The system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations 270 may also be denoted as "cell sites." Alternatively, individual sectors of a given base station 270 may be referred to as cell sites.

A terrestrial digital multimedia broadcasting (DMB) transmitter 295 is shown broadcasting to mobile terminals 100 operating within the system. The broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further depicts several global positioning system (GPS) satellites 300. Such satellites facilitate locating the position of some or all of the mobile terminals 100. Two satellites are depicted, but useful positioning information is obtained with a greater number of satellites.

The position-location module 115 (FIG. 1) of the mobile terminal 100 is typically configured to cooperate with the satellites 300 to obtain desired position information. Other types of position detection technology, such as location technology that may be used in addition to or instead of GPS location technology, may alternatively be implemented.

Some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 engage in calls, messaging, and other communications. Each reverse-link signal received by a given base station 270 is processed within that base station 270. The resulting data is forwarded to an associated BSC 275.

The BSC 275 provides call resource allocation and mobility management functionality including soft handoffs between the base stations 270. The BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 control the base stations 270 to transmit sets of forward-link signals to the mobile terminals 100.

In the following description, a control method applicable to the above-configured mobile terminal 100 is explained with respect to various embodiments. It is understood that the following embodiments can be implemented independently or in combination.

Near field communication (NFC) is further explained as follows. NFC enables communication to be performed between two devices according to a non-contact system within about 10 cm having a center frequency of about 13.5 MHz.

Figure 5:
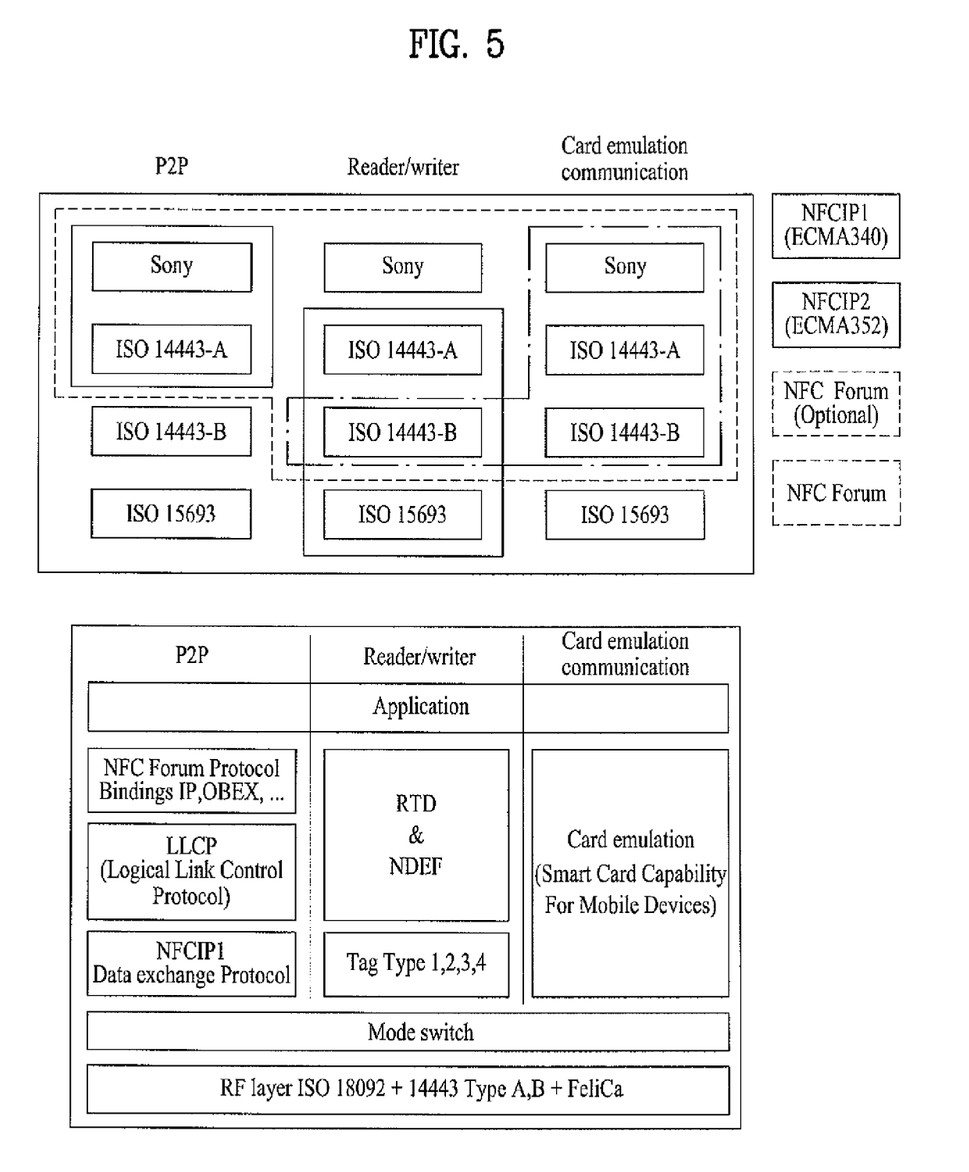
FIG. 5 is a diagram of the architecture for near field communication (NFC).
Figure 6:
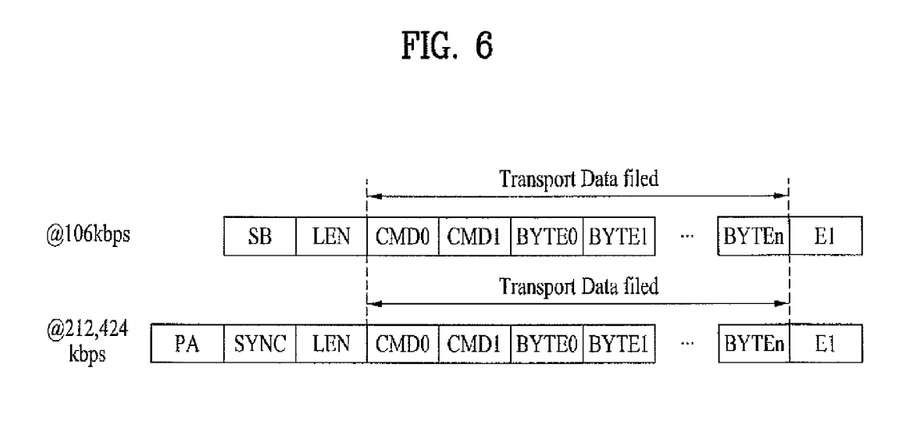
FIG. 6 is a diagram of a fame format of a NFC transport protocol.
Figure 7:
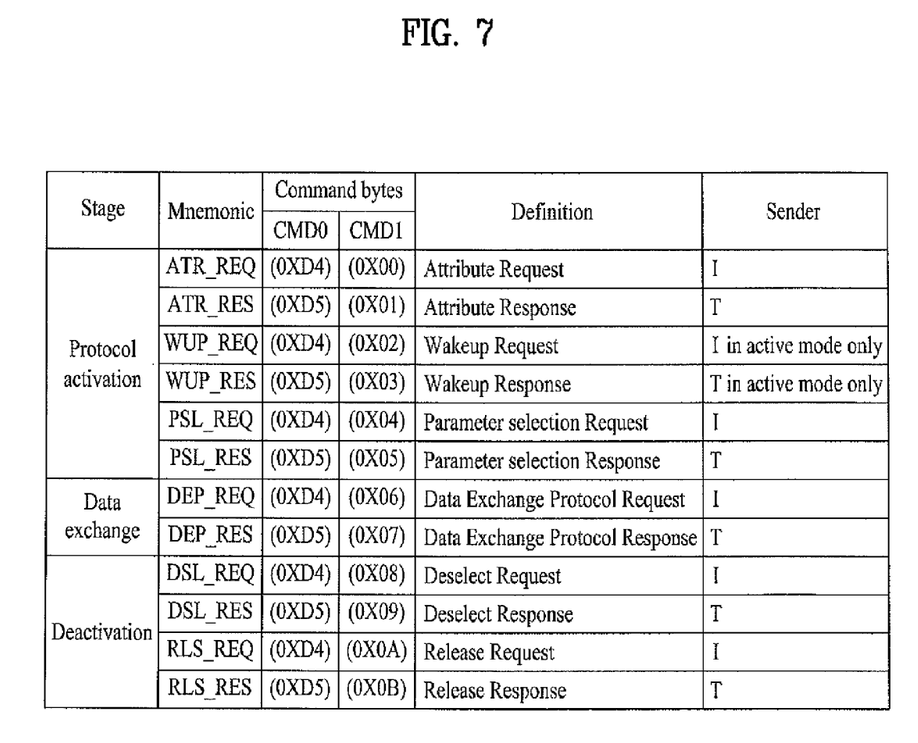
FIG. 7 is a table of commands in frame format for the NFC transport protocol.

An architecture of NFC is shown in FIG. 5. Frame format and commands of NFC transport protocol are shown in FIG. 6 and FIG. 7, respectively.

Embodiments of a controlling method of the above-configured mobile terminal are explained with reference to the accompanying drawings as follows. The following embodiments can be implemented independently or by being combined with each other.

If the display module 151 includes a touch screen, the following embodiments can be implemented more easily, although a touch screen is not necessary to the practice of the principles described in this disclosure. A display screen of the touch screen 151 is indicated by a reference number '400'.

First Embodiment

Various payment services are available using short-range communication. Representative non-limiting examples of the payment services include a transportation card service, a credit card service, a multimedia download service, and a discount coupon service. In the following description of a first embodiment, it is assumed that only one of the various payment services is available for the mobile terminal 100. More specifically, although at least two payment services are available for the mobile terminal 100, only the use of one preset of the at least two payment services is assumed.

Figure 8:
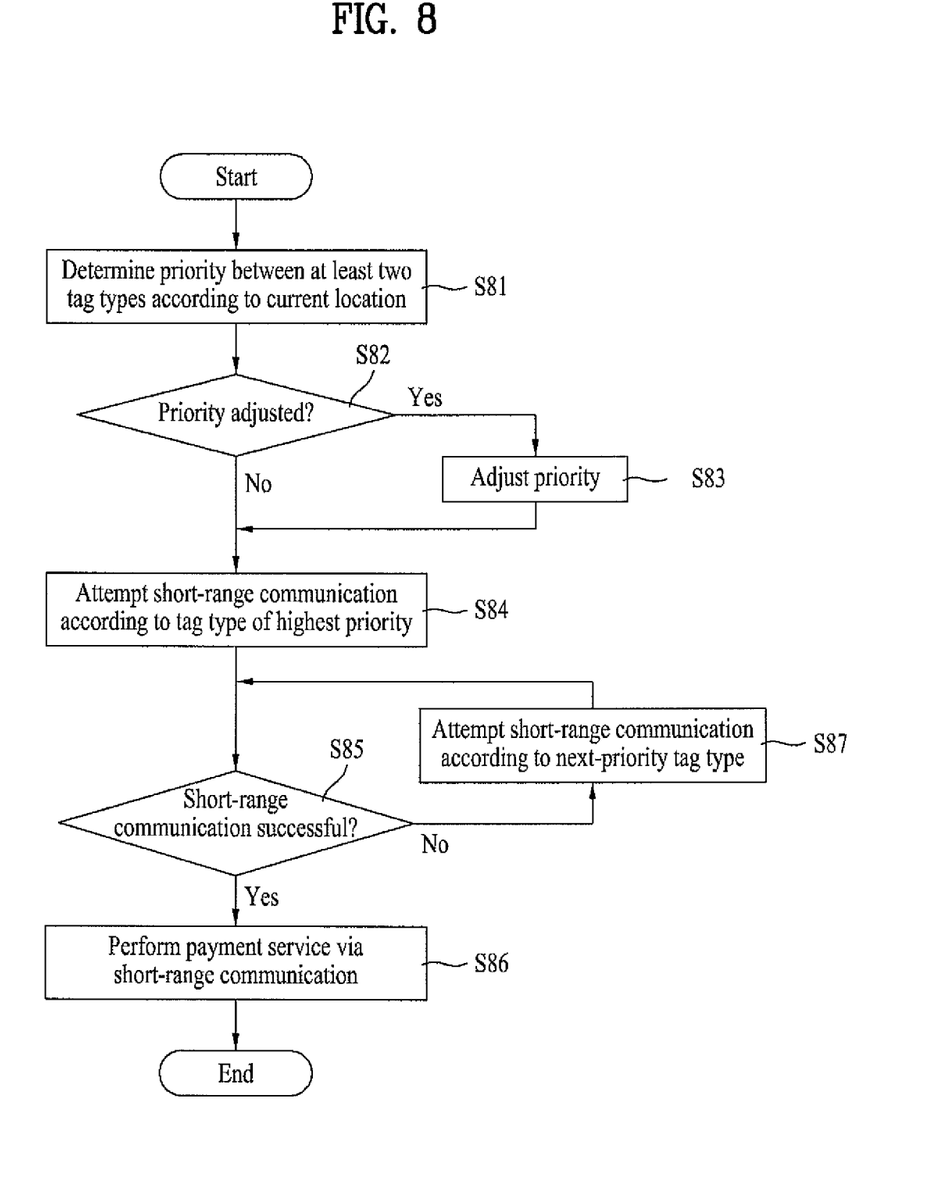
FIG. 8 is a flowchart for a method of controlling a mobile terminal according to a first embodiment of the present invention.
Figure 9:
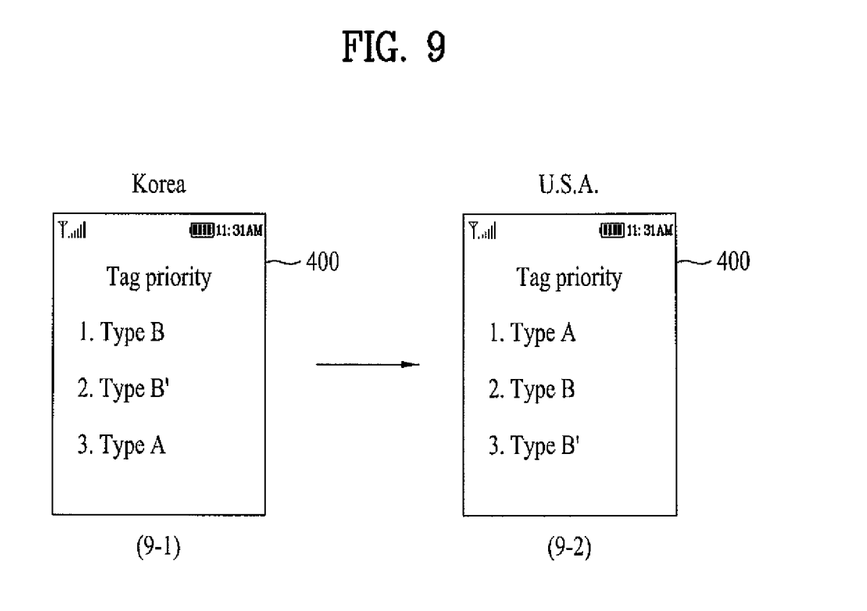
FIG. 9 and FIG. 10 are diagrams of screen displays for implementing a method of controlling a mobile terminal according to the first embodiment of the present invention.
Figure 10:
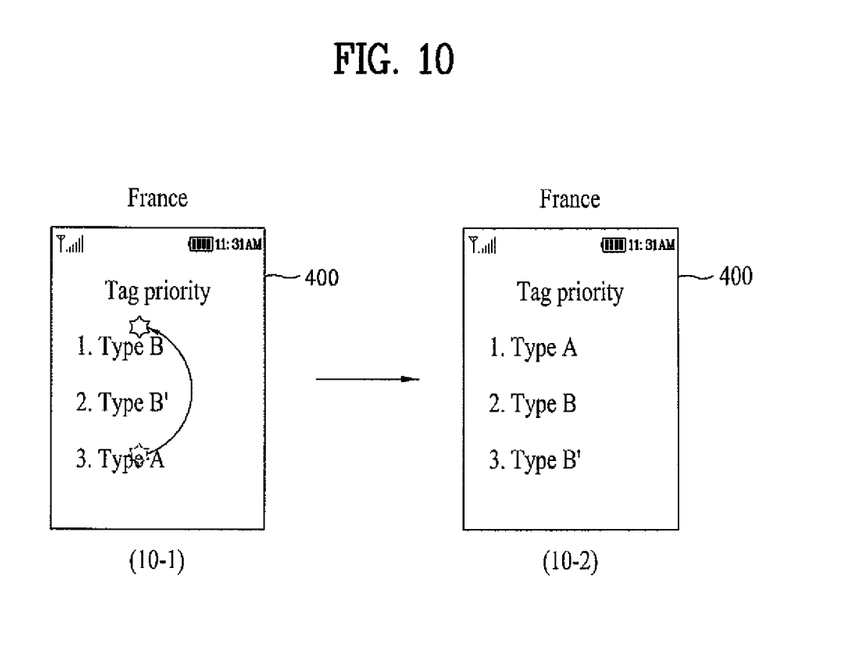

A method of controlling a mobile terminal according to a first embodiment of the present invention is explained with reference to FIGS. 8 to 10 as follows. FIG. 8 is a flowchart for a method of controlling a mobile terminal according to a first embodiment of the present invention, and FIG. 9 and FIG. 10 are screen displays for implementing a method of controlling a mobile terminal according to a first embodiment of the present invention.

Although the mobile terminal 100 performs roaming between several countries, the controller 180 is able to obtain a current location of the mobile terminal 100 from at least one of a country identifier and a network identifier of a mobile communication signal received by the mobile communication module 112. The controller 180 is also able to obtain a current location of the mobile terminal from the position-location module 115. The current location is determined by country unit or by a local unit within a country. Even if the mobile communication module 112 is not in use, the current location may be manually provided to the terminal.

Based on the obtained current location, the controller 180 is able to determine priority between at least two tag types available for the payment service [S81].

This is further explained with reference to Table 1 and FIG. 9. Table 1 shows a tag type requested or recommended per country for NFC short-range communication.

TABLE 1

| | | Region and Service Provider | | | | | | |
|---|---|---|---|---|---|---|---|---|
| | | France | Germany | U.K. | Norway | U.S.A | Japan | Korea |
| Tag type | ISO 14443 type proprietary | B, B' (optionally A) Mifare | A — | A Mifare | A Mifare | A Mifare | B Felica | B Mifare |

Referring to (9-1) of FIG. 9, for example, if the mobile terminal is located in Korea, priorities of tag types for the payment service are in order of Type B, Type B', and Type A, displayed on the touch screen 400. As this mobile terminal 100 moves into the U.S.A. through roaming, the mobile terminal 100 re-determines the priorities of the tag types for the payment service in order of Type A, Type B, and Type B', as shown in (9-2) of FIG. 9. This re-ordering of priorities is based on the current location being in the U.S.A. The current location may be obtained through the mobile communication module 112 or the position-location module 115.

The tag type priority determined on the basis of the current location need not always be fixed to the current location. Instead, the priority may be adjusted manually ([S82] of FIG. 8). This is further explained with reference to FIG. 10.

Referring to (10-1) of FIG. 10, when the mobile terminal is located in France, tag type priorities for the payment service are determined in order of Type B, Type B' and Type A, displayed on the touch screen 400. Type A is touched and then dragged onto type B on the touch screen 400. Referring to (10-2) of FIG. 10, the priorities of the tag types for the payment service are adjusted in order of Type A, Type B, and Type B' ([s83] of FIG. 8).

If the display does not include the touch screen, it is apparent to those skilled in the art that the priorities can be adjusted through appropriate key manipulations of another user input unit.

Once the tag type priorities of the for the payment service are determined, the controller 180 attempts the short-range communication with the external terminal according to the tag type having the highest priority [S84] when the mobile terminal 100 approaches an external terminal for the short-range communication.

If the short-range communication is successfully connected, the payment service is performed through the short-range communication [S85, S86]. If the short-range communication connection is unsuccessful, the controller 180 reattempts the short-range communication with the external terminal according to the tag type of the second highest priority [S85, S87].

Second Embodiment

In the first embodiment of the present invention, tag type priorities for a single payment service are determined. According to the determined priority, short-range communication for the payment service is performed. However, the mobile terminal 100 is not always used for the single payment service only. Optionally, the mobile terminal 100 can be configured to be alternately used for at least two payment services.

If the mobile terminal 100 is configured alternately to use at least two payment services, determining the tag type priorities is explained in the following description of a second embodiment of the present invention.

Figure 11:
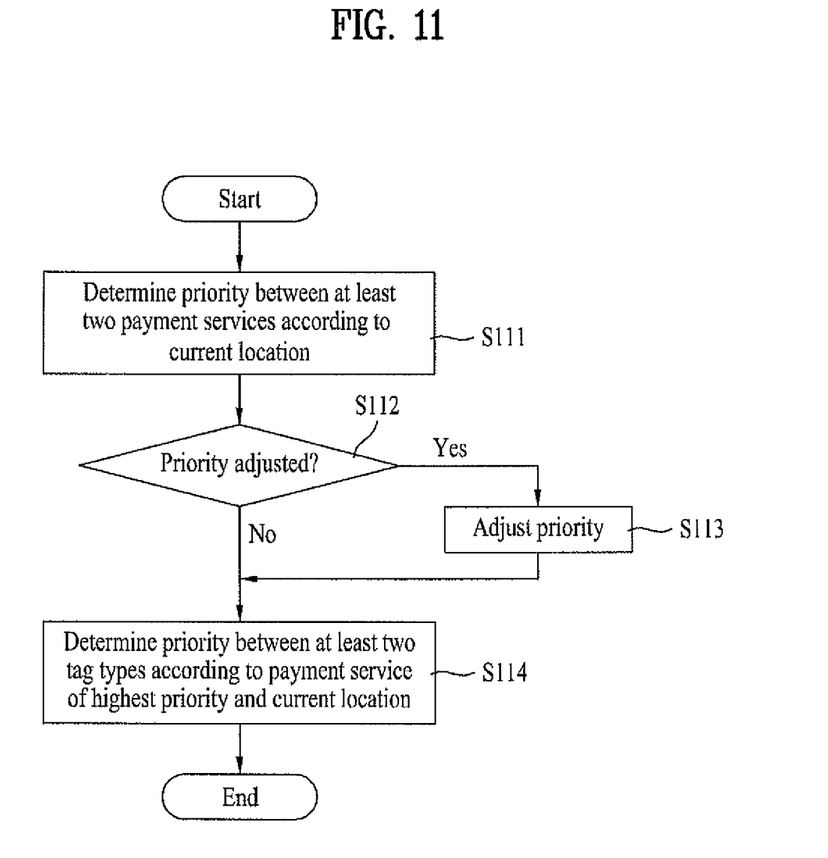
FIG. 11 is a flowchart for a method of controlling a mobile terminal according to a second embodiment of the present invention.

A method of controlling a mobile terminal according to a second embodiment of the present invention is explained with reference to FIGS. 11 to 13 as follows. FIG. 11 is a flowchart for a method of controlling a mobile terminal according to a second embodiment of the present invention, and FIG. 12 and FIG. 13 are diagrams of screen configurations for implementing a method of controlling a mobile terminal according to the second embodiment of the present invention.

The controller 180 initially obtains a current location of the mobile terminal from at least one of the mobile communication module 112, the user input unit 130, and the position-location module 115. Based on the obtained current location, the controller 180 determines priority between at least two payment services [S111]. This is explained in detail with reference to FIG. 12.

Figure 12:
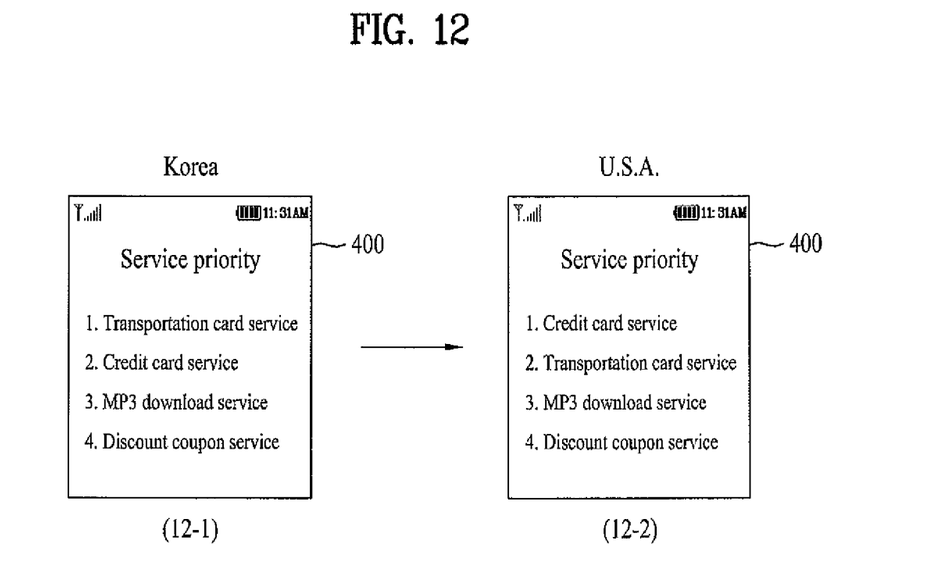
FIG. 12 and FIG. 13 are diagrams of screen displays for a method of controlling a mobile terminal according to a first embodiment of the present invention.
Figure 13:
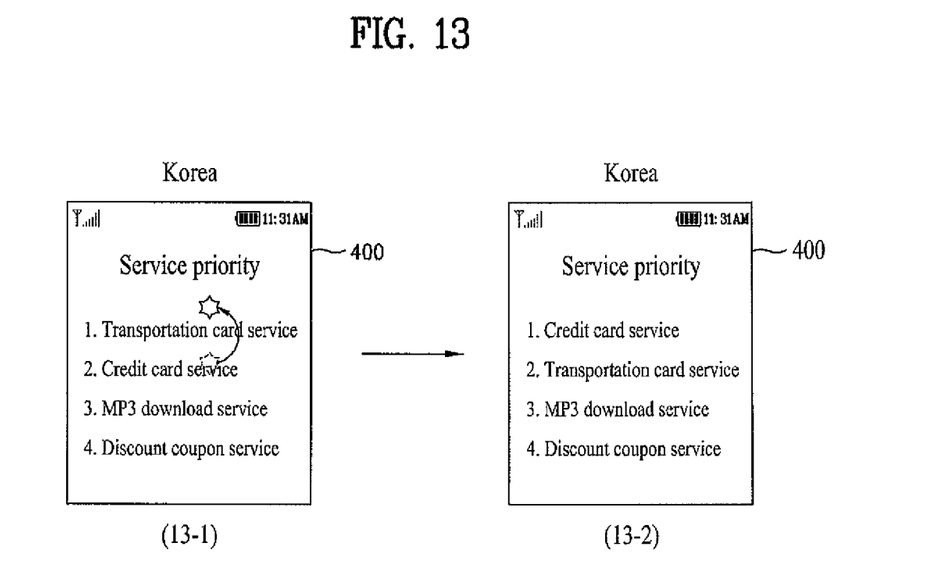

Referring to (12-1) of FIG. 12, when the mobile terminal 100 is located in Korea for example, priorities are in order of 'transportation card service', 'credit card service', 'MP3 download service' and 'discount coupon service' as displayed on the touch screen 400.

If the mobile terminal 100 roams into U.S.A, the mobile communication module 112 or the position-location module 115 obtains a current position in the U.S.A. The mobile terminal 100 then resets the priorities of the payment services, as shown in (12-2) of FIG. 12, to 'credit card service', 'transportation card service', 'MP3 download service' and 'discount coupon service', respectively.

The payment service priority determined on the basis of the current location is not always fixed to the current location. Instead, the payment service priority may be provided manually [S112] as explained with reference to FIG. 13.

Referring to (13-1) of FIG. 13, when the mobile terminal is located in Korea, the priorities of the payment services are 'transportation card service', 'credit card service', 'MP3 download service' and 'discount coupon service' displayed on the touch screen 400. The 'credit card service' is touched and then dragged onto the 'transportation card service' on the touch screen 400.

Referring to (13-2) of FIG. 13, the priorities of the payment services are adjusted in order of 'credit card service', 'transportation card service', 'MP3 download service' and 'discount coupon service', respectively [S113].

It is not required for the display to include the touch screen for adjusting the priorities. If the display does not include the touch screen, it is apparent to those skilled in the art that the priorities can be adjusted through appropriate key manipulations of another user input unit.

Subsequently, the controller 180 determines priority between at least two tag types available for the payment service of the highest priority [S114] based on the current location of the terminal 100.

Once the priority between the at least two tag types is determined, the short-range communication with the external terminal is attempted according to the tag type having the highest priority. This is apparent to those skilled in the art from the first embodiment of the present invention. For convenience of description, details of the short range communication are omitted.

Accordingly, the present invention provides the following advantage. According to at least one of embodiments of the present invention, although a terminal-located country or service provider is changed due to roaming, an appropriate tag for short-range communication is automatically or manually set. Therefore, a valid service payment or settlement can be still performed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a wireless communication unit configured to send and receive information about at least two payment services which are performed by short-range communication,
   a user input unit configured to receive a user input;
   a memory configured to store information comprising region-specific protocol standards for short-range communication, wherein at least two protocol standards are stored for each of the at least two payment services; and
   a controller configured to:
   obtain a current location of the mobile terminal;
   determine a priority of each of the at least two payment services according to the obtained current location;
   select a first priority payment service having a highest priority;
   determine a priority of each of the stored at least two protocol standards of the selected first priority payment service according to the obtained current location;
   select a first priority protocol standard having a highest priority; and
   cause the selected first priority payment service to be performed using the first priority protocol standard.

2. The mobile terminal of claim 1, wherein the controller is further configured to obtain the current location via the wireless communication unit.

3. The mobile terminal of claim 1, wherein the controller is further configured to obtain the current location via an input received via the user input unit.

4. The mobile terminal of claim 1, wherein the wireless communication unit comprises a short-range communication module.

5. The mobile terminal of claim 4, wherein the short-range communication module further comprises at least a radio frequency identification (RFID) module, a near field communication (NFC) module or a Bluetooth™ module.

6. The mobile terminal of claim 4, wherein:
   the wireless communication unit further comprises a mobile communication module; and the controller is further configured to obtain the current location via a mobile communication signal received via the mobile communication module.

7. The mobile terminal of claim 6, wherein the mobile communication signal includes at least a country identifier or a network identifier.

8. The mobile terminal of claim 4, wherein:
the wireless communication unit further comprises a global positioning system (GPS) module; and
the controller is further configured to obtain the current location via a position signal received from the GPS module.

9. The mobile terminal of claim 4, wherein:
the controller is further configured to:
control the wireless communication unit to perform the selected first priority payment service using the first priority protocol standard, and
control the wireless communication unit to perform the selected first priority payment service using a second priority protocol standard having a second highest priority of the at least two protocol standards when the short-range communication for performing the selected first priority payment service using the first priority protocol standard fails to establish a connection.

10. The mobile terminal of claim 4, wherein the controller is further configured to determine the priority of the at least two protocol standards according to an input received via the user input unit.

11. The mobile terminal of claim 10, further comprising:
a display unit configured to display information,
wherein the controller is further configured to control the display unit to display the first priority protocol standard.

12. The mobile terminal of claim 4, wherein the memory is further configured to store information for the at least two payment services.

13. The mobile terminal of claim 12, wherein the controller is further configured to:
select one of the at least two payment services according to an input received via the user input unit, and
determine the priority of the at least two protocol standards according to the selected payment service.

14. The mobile terminal of claim 13, wherein the controller is further configured to determine the priority of the at least two protocol standards according to an input received via the user input unit.

15. The mobile terminal of claim 14, further comprising:
a display unit configured to display information,
wherein the controller is further configured to control the display unit to display the first priority protocol standard.

16. The mobile terminal of claim 13, wherein the controller is further configured to:
determine the priority of the at least two protocol standards according to an input received via the user input unit.

17. The mobile terminal of claim 12, further comprising:
a display unit configured to display information,
wherein the controller is further configured to control the display unit to display:
the first priority payment service; and
a second priority payment service having a second highest priority of the at least two payment services.

18. A method of controlling a mobile terminal, the method comprising:
storing, via a memory, information comprising location-specific protocol standards for short-range communication, wherein at least two protocol standards are stored for each of at least two payment services which are performed by short-range communication;
obtaining a current location of the mobile terminal;
determining a priority of each of the at least two payment services according to the obtained current location;
selecting a first priority payment service having a highest priority;
determining a priority of each of the stored at least two protocol standards of the selected first priority payment service according to the obtained current location;
selecting a first priority protocol standard having a highest priority; and
causing the selected first priority payment service to be performed using the first priority protocol standard.

19. The method of claim 18, further comprising obtaining the current location from a wireless communication unit of the mobile terminal.

20. The method of claim 18, further comprising obtaining the current location from an input received via a user input unit of the mobile terminal.

* * * * *